United States Patent [19]
Daley, Jr.

[11] Patent Number: 5,275,116
[45] Date of Patent: Jan. 4, 1994

[54] CAM AND WOBBLE FOLLOWER LOOPER DRIVE FOR SEWING MACHINE

[75] Inventor: William C. Daley, Jr., Suffield, Conn.

[73] Assignee: Merrow Machine Company, Inc., Newington, Conn.

[21] Appl. No.: 874,556

[22] Filed: Apr. 21, 1992

[51] Int. Cl.$^5$ .................. D05B 57/02; F16H 23/00
[52] U.S. Cl. ..................... 112/199; 112/200; 74/60
[58] Field of Search ............ 112/165, 166, 192, 197, 112/199, 200, 201, 202, 220, 284, 443; 74/9, 20, 53-; 123/90.15, 90.16, 90.17, 90.18, 90.2, 90.21, 90.26, 90.28; 139/79, 80, 81; 310/50

[56] References Cited

U.S. PATENT DOCUMENTS

| | | | |
|---|---|---|---|
| 22,719 | 1/1859 | Fosket et al. | 112/199 |
| 403,163 | 5/1889 | Weiss | 112/200 |
| 1,980,527 | 11/1934 | Hewton | 74/55 |
| 2,224,028 | 12/1940 | Becker | 112/199 |
| 2,998,787 | 9/1961 | Pollmeier | 112/200 |
| 3,099,973 | 8/1963 | Lees | 112/199 |
| 3,524,088 | 8/1970 | Ryckman, Jr. | 310/50 |
| 3,730,150 | 5/1973 | Codner, Jr. | 123/90.2 X |
| 3,915,129 | 10/1975 | Rust et al. | 123/90.18 |
| 3,946,766 | 3/1976 | Amigues | 139/66 R |
| 3,986,529 | 10/1976 | Pfarrwaller | 139/79 |
| 4,022,140 | 5/1977 | Lienemann | 112/199 |
| 4,085,690 | 4/1978 | Papajewski | 74/54 X |
| 4,199,995 | 4/1980 | Murakami | 74/54 |
| 4,311,105 | 1/1982 | Buzzi | 112/199 |
| 4,523,533 | 6/1985 | Toman | 112/199 |
| 4,716,939 | 1/1988 | Palau | 139/79 |
| 4,768,475 | 9/1988 | Ikemura | 74/567 X |
| 4,873,932 | 10/1989 | Adams | 112/443 |
| 4,928,650 | 5/1990 | Matayoshi et al. | 123/90.28 X |
| 4,941,367 | 7/1990 | Konves | 74/60 X |
| 5,048,474 | 9/1991 | Matayoshi et al. | 123/90.18 |
| 5,080,055 | 1/1992 | Komatsu et al. | 123/90.17 |

FOREIGN PATENT DOCUMENTS

| | | | |
|---|---|---|---|
| 0115861 | 12/1968 | Norway | 112/199 |
| 2039549 | 8/1980 | United Kingdom | 112/199 |

OTHER PUBLICATIONS

"Analysis and Design of Mechanisms" Second Edition by Deane Lent, Professor of Mechanical Engineering, M.I.T., Published by Prentice-Hall, Inc., Chapter 10, p. 408 10.45 Cam-Driven Oscillating Drive.

Primary Examiner—Clifford D. Crowder
Assistant Examiner—Ismael Izaguirre

[57] ABSTRACT

A radially facing circumferential surface of a cam, in at least some planes which radiate from the cam axis, includes lines which are inclined relative to the cam axis. The inclinations of these lines vary from one axial plane to another, except in the dwell regions of the cam. A wobble member is supported for oscillating movement about a wobble axis. One or more cam followers on the wobble member engage the cam on opposite sides of a transverse reference plane which is substantially perpendicular to the cam axis. During operation of the mechanism, the cam turns about its axis, and the wobble member oscillates about its axis. The mechanism is used in a sewing machine to move a looper.

39 Claims, 3 Drawing Sheets

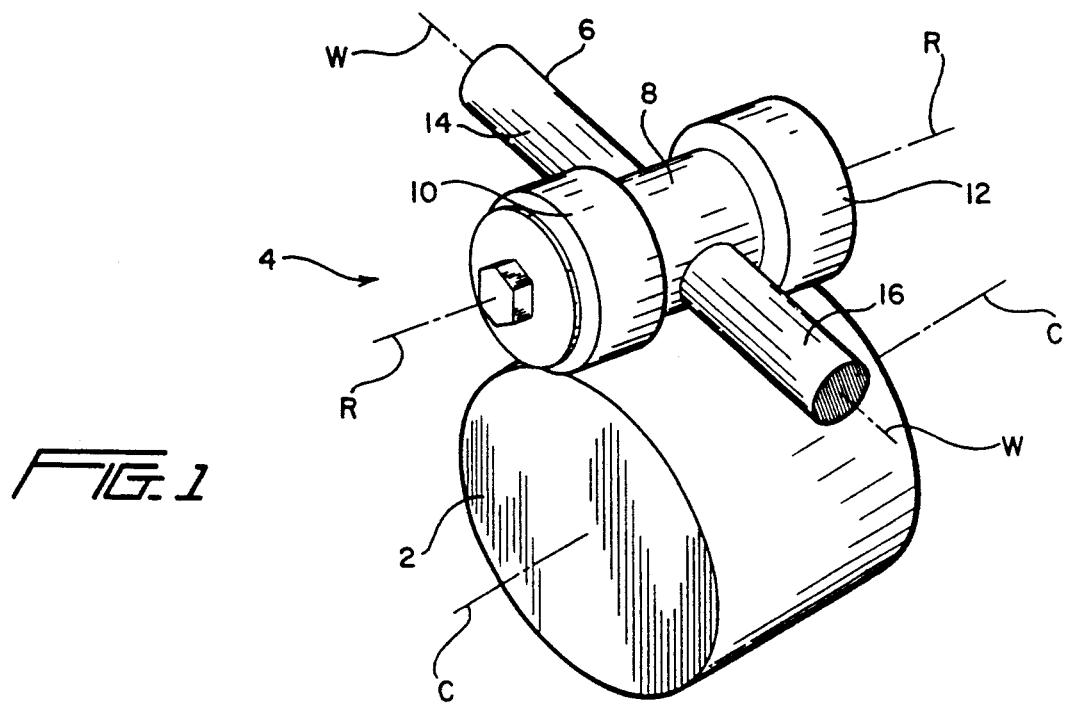
FIG. 1
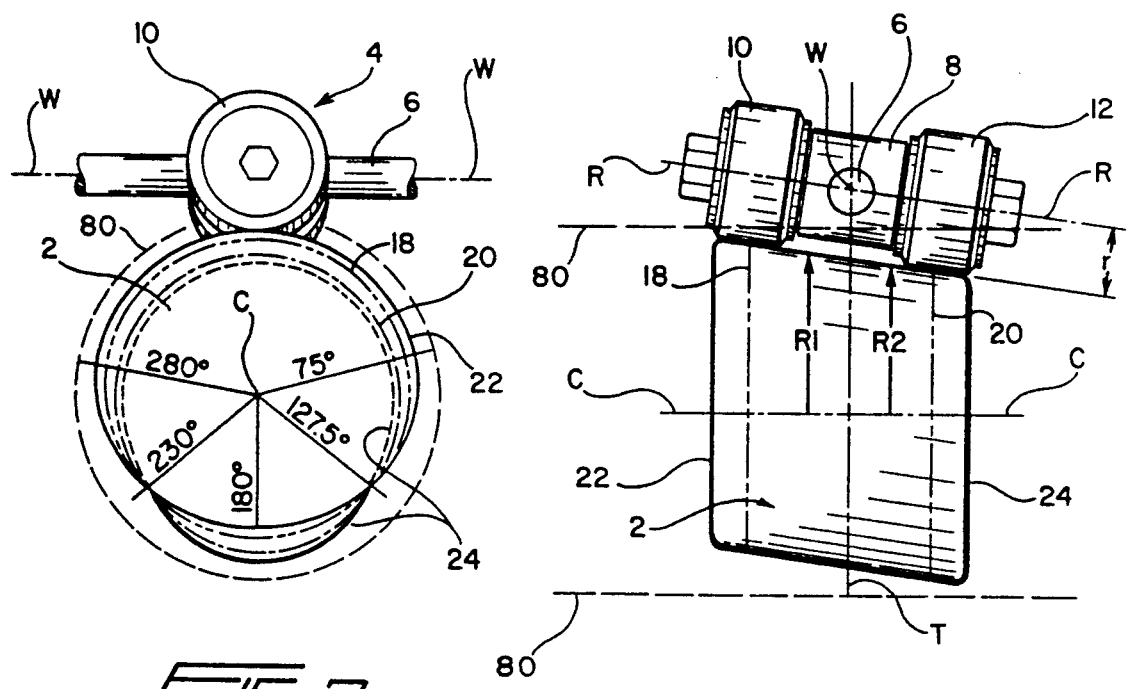
FIG. 2
FIG. 3

CAM AND WOBBLE FOLLOWER LOOPER DRIVE FOR SEWING MACHINE

BACKGROUND OF THE INVENTION

1. FIELD OF THE INVENTION

This invention relates to a novel cam, a mechanism which utilizes such a cam, and to sewing machines including such a cam and/or mechanism.

2. BACKGROUND INFORMATION

In overedge sewing machines such as those disclosed in U.S. Pat. Nos. 2,879,733, 3,958,460, and 4,572,092, loopers are moved by cam followers which ride in slots formed in cylindrical cams. The existing mechanisms are satisfactory, but the present invention represents an attempt to provide a novel mechanism which is quieter, faster and more durable.

SUMMARY OF THE INVENTION

In one respect, this invention involves a cam supported for rotation about a cam axis, and provided with a radially facing circumferential surface which, in axial planes radiating from the cam axis, includes lines which have inclinations relative to the cam axis which at some times differ from one axial plane to another. In this specification, the shape of the cam is described in terms of parameters $R1$ and $R2$ which represent the respective radial distances from the cam axis to points which are located equidistantly from and are on opposite sides of a transverse reference plane which lies perpendicular to the cam axis. The cam profile provides values of $R1$ and $R2$ which vary from one axial plane to another except during dwells. Preferably, the circumferential surface of the cam has a profile which provides a value for $R1+R2$ which is substantially equal for all axial planes which radiate from the cam axis; these values $R1$ and $R2$ being measured at equal spacings from the transverse reference plane.

The invention also involves a mechanism including a cam supported for rotation about a cam axis which is substantially perpendicular to a transverse reference plane. The cam has a radially facing circumferential surface which, in planes which lie transverse to the cam axis, is asymmetrical relative to the axis. The circumferential surface of the cam has a profile in which $R1$ and $R2$, as defined above, are usually unequal in axial planes which include the cam axis. A wobble member is supported for oscillating movement about a wobble axis, and cam follower means on the wobble member engage the cam on opposite sides of the transverse reference plane so that the wobble member oscillates and the cam turns (rotates or oscillates) about its axis when the cam follower means successively engage different portions of the cam's circumference. Preferably (FIGS. 6+7), the sum of $R1+R2$ is substantially constant for all portions of the cam's circumference; the distance from the cam axis to the wobble axis (not taking into account small differences due to pressure angles), is approximately equal to $$\frac{R1 + R2}{2}$$

and, the wobble axis lies in the transverse reference plane. The cam follower means preferably includes at least two rollers which are rotatable about a common axis and are spaced on opposite sides of the transverse reference plane. The distance from the cam axis to a point where the roller axis intersects the transverse reference plane T (with roller axis parallel to the cam axis, not taking pressure angles into account) is substantially $$\frac{(R1 + r) + (R2 + r)}{2},$$

wherein "r" represents the radii of respective rollers.

The invention also involves a sewing machine utilizing the novel cam and mechanism. In the sewing machine environment, the cam is mounted on a driven shaft, and a looper is operatively connected to the wobble member.

The invention may take many forms, only a few examples of which are provided in the accompanying specification.

BRIEF DESCRIPTION OF THE DRAWINGS

FIG. 1 is a diagrammatic isometric view of a mechanism according to one form of the invention.

FIG. 2 is an end view of the mechanism of FIG. 1.

FIG. 3 is a frontal view of the mechanism of FIG. 1.

DESCRIPTION OF THE PREFERRED EMBODIMENT

Figure 4:
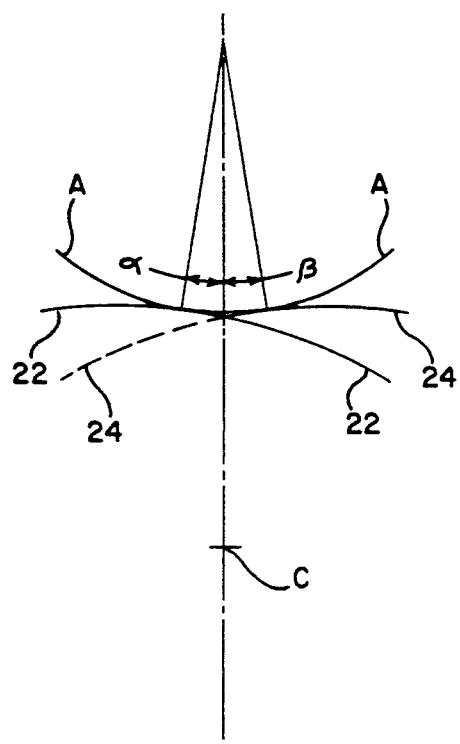
FIG. 4 is a diagrammatic illustration of pressure angles which occur in the apparatus according to one form of the invention.

The mechanism illustrated in FIGS. 1-3 includes a cam 2 which rotates about a fixed cam axis C, and a wobble member 4 which oscillates about a fixed axis W. The wobble member includes a shaft 6, a wobble block 8 rigidly mounted on the shaft, and a pair of rollers 10 and 12 which are rotatably mounted on concentric journals (not shown) which are integral with and extend in opposite directions from the block 8. The wobble block 8 is a midportion of the wobble member 4, and the shaft 6 provides two aligned bearing journals 14, 16 which are concentric with the axis W and extend in opposite directions from the block 8. The rollers 10 and 12 are rotatable about a common axis R which intersects the axis W, is fixed with respect to the wobble member 4, and is inclinable relative to the cam axis C as will be described below.

A plane which includes the wobble axis W and is perpendicular to the cam axis C is referred to in this specification as a transverse reference plane. It appears as a vertical line T in FIG. 3. The cylindrical external surfaces of the rollers 10 and 12 engage the exterior surface of the cam 2, and these rollers are located on opposite sides of the transverse reference plane where they ride on the radially facing circumferential surface of the cam. The rollers are spaced substantially equal distances from opposite sides of the transverse reference plane, and the circumferential surface of the cam provides surface contact (tracks) for the rollers. In FIGS. 2 and 3, the center of the track for roller 10 is indicated by the double-dot line 18, and the track for the roller 12 is indicated by the dot-dash line 20. In FIG. 2 the solid line 22 indicates the perimeter of the left end of the cam as seen in FIG. 3; and, the solid and broken lines 24 represent the perimeter of the right end of the cam of FIG. 3. As can be seen in FIG. 2, both tracks 18 and 20 are circular and concentric with the axis C from about 280° to 75°, so the wobble block will dwell at a constant inclination in this region of the cam. From about 75° to the full rise location at about 180°, the radius of track 20 increases and the radius of track 18 decreases, so this region of the cam causes the wobble member to move about its axis W in a direction which is counterclockwise in FIG. 3. At 127.5° the roller axis is instantaneously parallel to the cam axis; at 180°, the roller axis reaches its full rise to provide a maximum forward pitch; at 230° the roller axis is again parallel to the cam axis; and, at about 280°, the roller axis reaches and dwells at its maximum rearward pitch until it commences its next oscillatory movement at 75°.

The configuration of the cam 2 is believed to be unique. The profile of its radially facing circumferential surface is such that rotation of the cam will oscillate the wobble shaft 6. Conversely, if the wobble member 4 is oscillated the cam will rotate. Such rotation will be less than 360°, unless the rotating assembly includes a flywheel and the oscillation forces are exerted by the cam followers at times and in directions tending to sustain cam rotation.

As can be understood from FIG. 2 and as seen in FIG. 3, the cam's circumferential surface, in axial planes radiating from the cam axis C, includes lines which have inclinations relative to the cam axis which differ from one axial plane to another except in dwell regions. The transverse cross section of the cam varies continuously along its length. In transverse cross sections, the entire cam 2 is noncircular. FIG. 3 shows radii R1 and R2 which are the respective radial distances from the cam axis to points which are located equidistantly from and are on opposite sides of the transverse reference plane T. In all axial planes through axis C (and neglecting small differences due to pressure angles), the sum of R1 and R2 is approximately the same so that the distance one roller is raised is equal to the distance the other roller is lowered.

The configuration of the cam may alternatively be described with respect to a geometric reference cylinder, in space, which is shown at 80 in FIGS. 2 and 3. This reference cylinder is concentric with the cam axis C. It can have any diameter. The profiles of the circumferential surface of the cam, in planes which are transverse to the axis C, are noncircular on both sides of the transverse reference plane T; and, different profiles are at different positions relative to the cylinder 80.

The mechanism has certain advantages because the rollers always rotate in the same direction on their axis R in contrast to a cam-following roller which changes its rotational direction as in the case of a conventional grooved cylindrical cam (barrel cam) for driving a sewing machine looper.

The design also provides very low pressure angles. These pressure angles are of approximately equal magnitude and of opposite direction for the two rollers 10 and 12. All thrust forces in the direction of axis W are virtually eliminated. This is illustrated in FIG. 4 which shows the mechanism at its maximum pressure angle state, where the 127.5° axial plane of the cam 2 is at the wobble member. The arc A represents the outboard ends of the rollers 10 and 12 where they ride on the cam 2. In this example, the pressure angle $\alpha$ of the cam 2 against the roller 10 is only about 7.5°, and the pressure angle $\beta$ of the cam 2 against the roller 12 is about 8.75°. These angles are so small that the cam and the wobble member are subjected to very low forces in directions circumferential to the cam and axial to the wobble axis W. Furthermore, these forces tend to cancel each other as the force on the roller 10 is clockwise and the force on the roller 12 is counterclockwise relative to the cam axis and, therefore, the axial forces on wobble shaft 6 is always essentially zero. Thrust forces on the cam axis are also very low with this style cam, compared to barrel cams.

When the angular velocity of the wobble block is zero (i.e. during a dwell, at maximum rise, and at minimum rise) the pressure angles are zero for mechanisms in which the wobble axis W is perpendicular to a plane which includes the cam axis C and the roller axis R. (Offset followers would have a pressure angle at this time.) The rollers contact the cam in a straight line which is in an axial plane of the cam. This axial plane also includes the cam axis C and the roller axis R. At all other times, the rollers 10 and 12 contact the cam 2 at points which are slightly displaced from such a line and plane. The rollers may have unequal pressure angles, although usually substantially equal and always opposite, and their lines of contact with the cam are slightly curved. In this example, the two pressure angles and the curvature of the line of contact reach their maximums at the 131° position. This curvature is so slight that, for purposes of this specification, the lines of contact are considered to be substantially straight and to lie in an axial plane which is at a slight angle, offset from the axial plane which includes cam axis C and roller axis R. In this specification, the phrase "portion of the cam's circumference" is used to describe a respective portion of the cam's surface which is in and near such an axial plane.

In some situations, it is desirable to provide means for adjusting the cam follower clearance or preload pressure. One of several manners of achieving this is to provide the structure shown in FIG. 5, where it will be seen that the wobble member is formed of two parts, shaft 26 and wobble block 28. The wobble block 28 includes an integral clamp provided with a bolt 30 which is tightened to connect the parts 26 and 28 rigidly together during normal operations. When the bolt 30 is loosened to release the clamping action, the shaft 26 can be rotated relative to the wobble block 28.

The cylindrical external surface 32 of the clamped segment of the shaft 26 and the cylindrical internal surface 34 of the wobble block clamp are eccentric to the wobble axis W, such eccentricity initially being in a direction which lies parallel to the roller axis R. This relationship permits adjustment movement to change the distance between the cam follower axis R and the wobble axis W. When it is desired to adjust the mechanism, the bolt 30 is loosened and the shaft 26 is rotated relative to the wobble block 28 to move the rollers 10 and 12 toward or away from the cam. When proper positioning is achieved, the bolt 30 is retightened.

Figure 6:
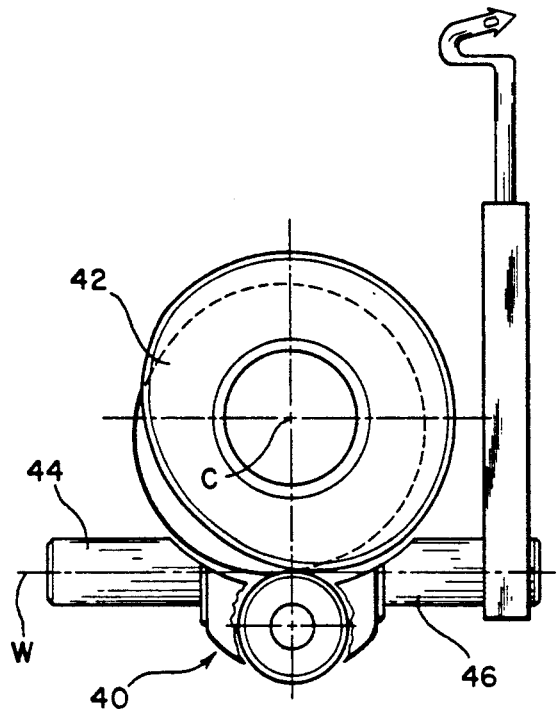
FIGS. 6 and 7, respectively, show end and frontal views of a further embodiment of the invention.
Figure 7:
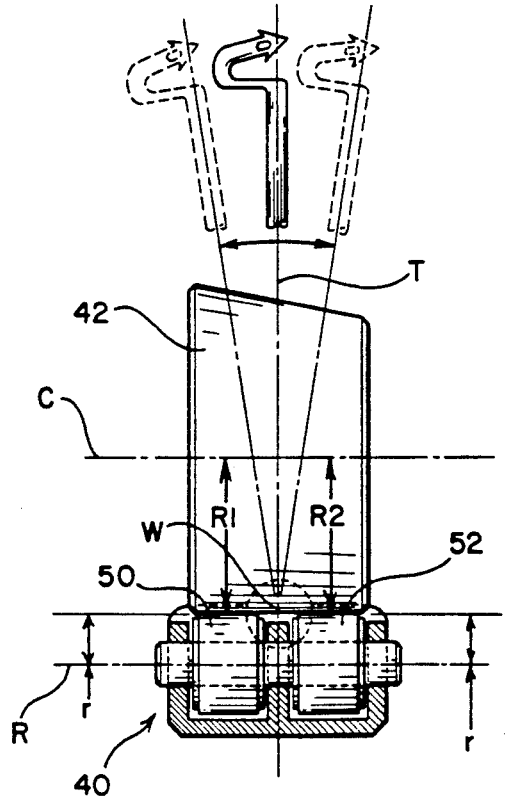

In the embodiment of the invention shown in FIGS. 6 and 7, the wobble member 40 is a yoke-like device, the midportion of which has a recess which faces toward the cam 42 and accommodates a portion of the cam so there is a space between the wobble member and the cam. Concentric bearing journals 44 and 46 extend in opposite directions on the wobble member to support it for oscillatory movement on a wobble axis W which is tangent to the cam surface midway between the cam follower rollers 50 and 52. The circumferential surfaces of the rollers 50 and 52 are tangent to a plane which includes the wobble axis W. The distance from the cam axis to the wobble axis is $$\frac{R1 + R2}{2}$$

in a plane parallel to the paper of FIG. 7 (which includes the cam axis C and the roller axis R), when the roller axis R is horizontal or parallel to the cam axis C, the distance from the cam axis to a point where the roller axis intersects the transverse reference plane T is as follows, (where "r" represents the radii of the respective rollers):

$$\frac{(R1 + r) + (R2 + r)}{2}$$

The relationships described in this paragraph are true when pressure angles are zero (during dwells, at maximum rise, at minimum rise), and they are substantially true at all other times because the pressure angles are small in the disclosed mechanism.

Figure 8:
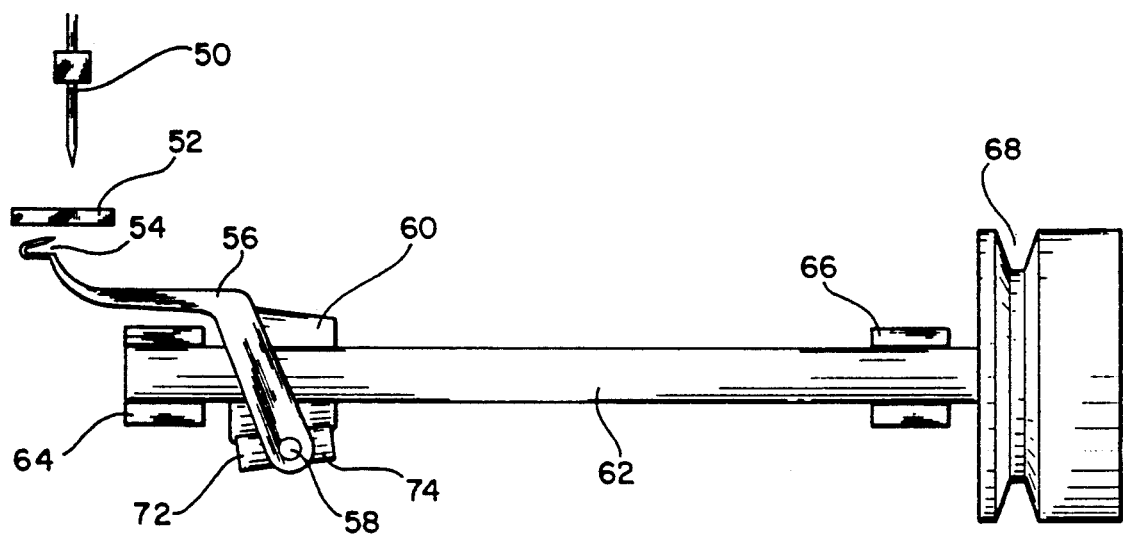
FIG. 8 shows, in diagrammatic form, a sewing machine which utilizes a lower looper driving mechanism according to the invention.

FIG. 8 shows, in a very schematic manner, the utilization of a mechanism according to the invention in an overedge sewing machine of the "Merrow" type disclosed in U.S. Pat. Nos. 2,879,733, 3,958,460, and 4,752,092, all of which are incorporated herein by reference.

The machine is conventional in the respect that it has a vertically or arcuately moving needle 50, a needle plate 52, and a lower looper 54 below the needle plate. The lower looper is connected by an arm 56 to a wobble shaft 58 which is moved by a mechanism according to this invention. The cam 60 and a handwheel 68 are fixed to and rotatable with a shaft 62 which is mounted on bearings 64 and 66. When the shaft 62 rotates, the radially facing surface of the cam 60 is followed by the rollers 72, 74, causing oscillatory movement of the wobble shaft 58, the arm 56, and the lower looper 54. The movement of the lower looper 54 is timed by the cam 60 to relate to the movement of the needle 50. An upper looper can be driven by a linkage connected to a second mechanism constructed according to this invention, including another cam (not shown) mounted on the shaft 62.

The invention may take many forms other than the illustrated embodiments. For example, wobble journals 16 and 44 may be omitted in lightly loaded mechanisms. The cam may be formed of one piece or multiple pieces; its rotational axis can be parallel and eccentric to the geometrical axis C; and, it may have contact surfaces (tracks) which are axially spaced apart. Such contact surfaces will be aligned and at a same inclination in each axial plane; and, the projections of the contact surfaces will define a circle in the transverse reference plane in configurations of the type shown in FIGS. 6 and 7.

The wobble axis does not have to be exactly perpendicular to the cam axis. The wobble axis may intersect the cam, be tangent to the cam as in FIGS. 6 and 7, or be radially spaced from the cam in FIGS. 2 and 3.

Any number of cam followers may be used. They may roll or slide on the cam. If a single cam follower is used, it should be long enough to engage the cam on both sides of the transverse reference plane. The cam followers do not have to be directly above or directly below the centerline of the cam. In some situations, offset cam followers may optimize pressure angles or facilitate assembly and adjustment.

The invention may be used in many different types of machines. The version shown in FIG. 3 can be modified by adding a one-way clutch which connects the wobble block 8 to the shaft 6. Oscillation of the wobble block will then drive the shaft 6 in only one direction to drive an indexing mechanism.

Figure 5:
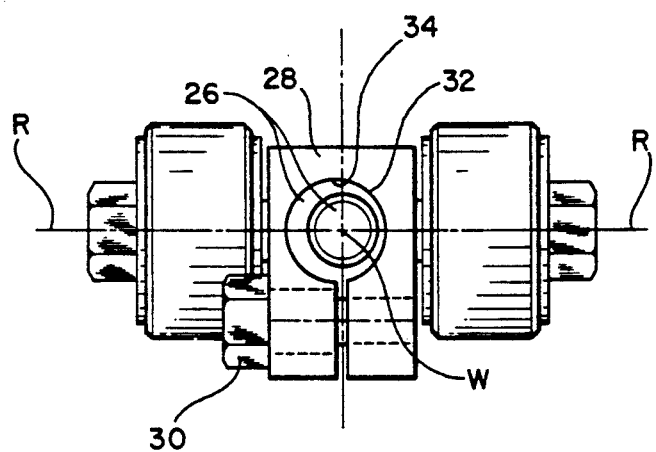
FIG. 5 is a frontal view showing a modified version of the wobble member of FIG. 1 which permits one of many possible ways of adjustment of the spacing or preloading between the cam and the cam follower.

A mechanism of the type shown in FIGS. 5–7 may have applicability as a poppet valve operator in pumps and internal combustion engines. A lever attached to the journal 46 can move a valve to and from its seated position, thus eliminating the need for heavy valve springs and reducing the amount of energy required for valve operations.

From the foregoing, persons skilled in the art will realize that the invention may take many forms other than the preferred embodiments disclosed in this specification. Accordingly, it is emphasized that the invention is not limited to the disclosed structures but is encompassing a wide variety of structures and uses which fall within the spirit of the following claims.

I claim:

1. A mechanism having a cam axis, a plurality of axial planes which each include said cam axis, a plurality of transverse planes which are substantially transverse to said cam axis, one of said transverse planes being a transverse reference plane, said mechanism comprising, a cam having a radially facing circumferential surface defined by a plurality of points; means for supporting said cam for turning movement about said cam axis; said circumferential surface being asymmetrical relative to said cam axis; said cam having a shape in which R1 is not equal to R2 in some of said axial planes; wherein R1 and R2 are the respective values of radial distances from the cam axis to points on said circumferential surface which are located equidistantly from and are on opposite sides of said transverse reference plane; R1 and R2 each having values which vary from one axial plane to another in at least some regions of the cam;

a wobble member, means for supporting the wobble member for oscillating movement about a stationary wobble axis, said wobble member having cam follower means which engage said cam circumferential surface at two locations which: (i) each circumferentially consist of only a portion of the cam circumferential surface, (ii) are in spaced apart transverse planes, (iii) are substantially in a same axial plane, and (iv) are on opposite sides of the transverse reference plane so that the wobble member oscillates due to changing values of R1 and R2 when the cam turns.

2. The mechanism according to claim 1 where, the sum of R1+R2 is substantially constant for all said portions of the cam's circumference except for small sum difference attributable to pressure angles.

3. The mechanism according to claim 1 wherein the distance from the cam axis to the wobble axis is equal to $$\frac{R1 + R2}{2}.$$

4. The mechanism according to claim 1 wherein the wobble axis lies substantially in said transverse reference plane.

5. The mechanism according to claim 1 wherein the cam follower means includes at least two rollers.

6. The mechanism according to claim 5 wherein the rollers are rotatable about a common roller axis.

7. The mechanism according to claim 6 wherein the rollers are on opposite sides of said transverse reference plane.

8. The mechanism according to claim 5 wherein both of said rollers have circumferential surfaces which are tangent to a plane which includes the wobble axis.

9. The mechanism according to claim 1 wherein the wobble member includes a midportion and two aligned bearing journals which extend out from said midportion in opposite directions.

10. The mechanism according to claim 1 wherein the wobble member is provided with a recess which faces toward said cam and accommodates a portion of said cam and provides space between the wobble member and the cam.

11. The mechanism according to claim 1 wherein the cam follower means includes two rollers which are concentric with and are rotatable about a roller axis and wherein, in a plane which includes said cam axis and said roller axis, the distance from the cam axis to a point where the roller axis intersects said transverse reference plane is substantially $$\frac{(R1 + r) + (R2 + r)}{2},$$

wherein "r" is defined as the radii of the respective rollers.

12. The mechanism according to claim 1 wherein the wobble member includes first and second parts interconnected by a releasable connection for providing an adjustment movement between the first and second parts which changes the distance from the cam follower means to the wobble axis.

13. The mechanism according to claim 12 wherein the wobble axis is fixed, said releasable connection between the first and second parts includes a surface of the first part which mates with said surface of the first part and is concentric with the wobble axis and a surface of the second part which is eccentric to the wobble axis, said cam follower means being mounted on said second part.

14. A mechanism having a cam axis, a plurality of axial planes which each include said cam axis, a plurality of transverse planes which are substantially transverse to said cam axis, one of said transverse planes being a transverse reference plane, said mechanism comprising,
a cam having a radially facing circumferential surface defined by a plurality of points; means for supporting said cam for turning movement about said cam axis; said circumferential surface being asymmetrical relative to said cam axis; said cam having a shape in which a sum +R2 has a substantially constant value for all R1 to R2 in some of said axial planes; wherein R1 and R2 are the respective values of radial distances from the cam axis to points on said circumferential surface which are located equidistantly from and are on opposite sides of said transverse reference plane; R1 and R2 each having values which vary from one axial plane to another in at least some regions of the cam;
a wobble member, means for supporting the wobble member for oscillating movement about a stationary wobble axis which is not parallel to the cam axis, said wobble member having cam follower means which engage said cam circumferential surface at two locations which: (i) each circumferentially consist of only a portion of the cam circumferential surface, (ii) are in spaced apart transverse planes, (iii) are substantially in a same axial plane, and (iv) are on opposite sides of the transverse reference plane so that the wobble member oscillates due to changing values of R1 and R2 when the cam turns.

15. The mechanism according to claim 14, wherein the wobble axis lies in said transverse reference plane.

16. The mechanism according to claim 14 wherein the distance from the cam axis to the wobble axis is substantially equal to $$\frac{R1 + R2}{2},$$

where R1 and R2 are the respective radial distances, measured in said axial planes.

17. The mechanism according to claim 14, wherein the cam follower means includes two rollers.

18. The mechanism according to claim 17, wherein the rollers are rotatable about a common roller axis.

19. The mechanism according to claim 17, wherein the rollers are spaced substantially equal distances from and on opposite sides of said transverse reference plane.

20. The mechanism according to claim 17, wherein both of said rollers have circumferential surfaces which are tangent to a plane which includes the wobble axis.

21. The mechanism according to claim 14, wherein the wobble member is provided with a recess which faces toward said cam and accommodates a portion of said cam to provide a space between the wobble member and the cam.

22. The mechanism according to claim 14, wherein the cam follower means includes two rollers which are concentric with and are rotatable about a roller axis and wherein, in a plane which includes said cam axis and said roller axis, the distance from the cam axis to a point where the roller axis intersects said transverse reference plane is substantially $$\frac{(R1 + r) + (R2 + r)}{2},$$

wherein "r" is defined as the radii of the respective rollers.

23. A mechanism comprising,
an oscillating member,
an output shaft for supporting said oscillating member for oscillatory rotation about a fixed oscillatory axis,
cam means for repetitively oscillating said oscillating member and output shaft about said oscillatory axis in a prescribed sequence of motions which sequence occurs at least once during each revolution of the cam, said cam means having a circumferential cam surface, means for supporting said cam means for rotation about a rotary axis,
cam follower means connected to said oscillating member, said cam follower means simultaneously engaging said circumferential cam surface on opposite sides of a transverse reference plane, said transverse reference plane being substantially perpendicular to said rotary axis, said oscillatory axis being located in said transverse reference plane, said circumferential cam surface having profiles in transverse planes which lie perpendicular to said rotary axis, substantially all of said profiles on both sides of said transverse reference plane being noncircular, and different said profiles being at different positions in their respective transverse planes relative to a geometric reference cylinder which is concentric with said rotary axis.

24. The mechanism according to claim 23 including a sewing machine looper arm driven by said output shaft.

25. The mechanism according to claim 23 wherein the oscillating member is provided with a recess which faces toward said cam, said recess accommodating a portion of said cam and providing space between said oscillating member and said cam.

26. The mechanism according to claim 23 wherein the cam follower means engages said cam circumferential surface at a location which circumferentially consists of only a portion of the cam circumferential surface.

27. The mechanism according to claim 23 wherein said cam follower means includes two rollers which are rotatable about a common roller axis.

28. The mechanism according to claim 23 wherein the oscillating member is provided with a recess which faces toward said cam, said recess accommodating a portion of said cam and providing space between said oscillating member and said cam.

29. A sewing machine, comprising,
a looper,
an oscillating member,
an output shaft for supporting said oscillating member for oscillatory rotation about a fixed oscillatory axis, said looper being driven by said output shaft,
cam means for repetitively oscillating said oscillating member and output shaft about said oscillatory axis in a prescribed sequence of motions which sequence occurs at least once during each revolution of the cam, said cam means having a circumferential cam surface,
means for supporting said cam means for rotation about a rotary axis,
cam follower means connected to said oscillating member, said cam follower means simultaneously engaging said circumferential cam surface on opposite sides of a transverse reference plane, said transverse reference plane being substantially perpendicular to said rotary axis, said oscillatory axis being located in said transverse reference plane,
said circumferential cam surface having profiles in transverse planes which lie perpendicular to said rotary axis, substantially all of said profiles on both sides of said transverse reference plane being noncircular, and different said profiles being at different positions in their respective transverse planes relative to a geometric reference cylinder which is concentric with said rotary axis.

30. The mechanism according to claim 29 wherein the cam follower means engages said cam circumferential surface at a location which circumferentially consists of only a portion of the cam circumferential surface.

31. The mechanism according to claim 29 wherein said cam follower means includes two rollers which are rotatable about a common roller axis.

32. A mechanism having a cam axis, a plurality of axial planes which each include said cam axis, a plurality of transverse planes which are substantially transverse to said cam axis, one of said transverse planes being a transverse reference plane, said mechanism comprising, a cam having a radially facing circumferential surface defined by a plurality of points; means for supporting said cam for turning movement about said cam axis; said circumferential surface being asymmetrical relative to said cam axis; said cam having a shape in which R1 is not equal to R2 in some of said axial planes; wherein R1 and R2 are the respective values of radial distances from the cam axis to points on said circumferential surface which are located equidistantly from and are on opposite sides of said transverse reference plane; R1 and R2 each having values which vary from one axial plane to another in at least some regions of the cam;

a wobble member, means for supporting the wobble member for oscillating movement about a wobble axis, said wobble member having cam follower means which engage said cam circumferential surface on opposite sides of the transverse reference plane so that the wobble member oscillates due to changing values of R1 and R2 when the cam turns; said cam follower means including two rollers which are concentric with and are rotatable about a roller axis and wherein, in a plane which includes said cam axis and said roller axis, the distance from the cam axis to a point where the roller axis intersects said transverse reference plane is substantially $$\frac{(R1 + r) + (R2 + r)}{2},$$

wherein "r" is defined as the radii of the respective rollers.

33. A mechanism having a cam axis, a plurality of axial planes which each include said cam axis, a plurality of transverse planes which are substantially transverse to said cam axis, one of said transverse planes being a transverse reference plane, said mechanism comprising, a cam having a radially facing circumferential surface defined by a plurality of points; means for supporting said cam for turning movement about said cam axis; said circumferential surface being asymmetrical relative to said cam axis; said cam having a shape in which a sum R1+R2 has a substantially constant value for all of said axial planes; wherein R1 and R2 are the respective values of radial distances from the cam axis to points on said circumferential surface which are located equidistantly from and are on opposite sides of said transverse reference plane; R1 and R2 each having values which vary from one axial plane to another in at least some regions of the cam;

a wobble member, means for supporting the wobble member for oscillating movement about a wobble axis which lies in said transverse reference plane, said wobble member having cam follower means which engage said cam circumferential surface on opposite sides of the transverse reference plane so that the wobble member oscillates due to changing values of R1 and R2 when the cam turns; wherein the distance from the cam axis to the wobble axis is substantially equal to $$\frac{R1 + R2}{2},$$

where R1 and R2 are the respective radial distances, measured in said axial planes.

34. A sewing machine in which there is a cam axis, a plurality of axial planes which each include said cam axis, a plurality of transverse planes which are substantially transverse to said cam axis, one of said transverse planes being a transverse reference plane, said sewing machine comprising,
  a cam having a radially facing circumferential surface defined by a plurality of points; means for supporting said cam for turning movement about said cam axis; said circumferential surface being asymmetrical relative to said cam axis; said cam having a shape in which R1 is not equal to R2 in some of said axial planes; wherein R1 and R2 are the respective values of radial distances from the cam axis to points on said circumferential surface which are located equidistantly from and are on opposite sides of said transverse reference plane; R1 and R2 each having values which vary from one axial plane to another in at least some regions of the cam;
  a wobble member, means for supporting the wobble member for oscillating movement about a wobble axis, said wobble member having cam follower means which is two rollers engaging said cam circumferential surface on opposite sides of the transverse reference plane so that the wobble member oscillates due to changing values of R1 and R2 when the cam turns.

35. The sewing machine according to claim 34 where the sum of R1+R2 is substantially constant for all said axial planes.

36. The sewing machine according to claim 34 wherein the wobble axis lies in said transverse reference plane.

37. The sewing machine according to claim 34 wherein the rollers are rotatable about a common roller axis.

38. The sewing machine according to claim 37 wherein the rollers are spaced substantially equal distances from and are on opposite sides of said transverse reference plane.

39. The sewing machine according to claim 34 wherein the cam follower means includes two rollers which are concentric with and are rotatable about a roller axis and wherein, in a plane which includes said cam axis and said roller axis, the distance from the cam axis to a point where the roller axis intersects said transverse reference plane is substantially $$\frac{(R1 + r) + (R2 + r)}{2},$$

wherein "r" represents the radii of the respective rollers.

* * * * *